(12) United States Patent
Omura et al.

(10) Patent No.: US 10,899,663 B2
(45) Date of Patent: Jan. 26, 2021

(54) PROCESS FOR PRODUCING MODIFIED FLY ASH

(71) Applicant: TOKUYAMA CORPORATION, Shunan (JP)

(72) Inventors: Kohei Omura, Shunan (JP); Takuya Seki, Shunan (JP); Hiroyoshi Kato, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 16/494,521

(22) PCT Filed: Mar. 19, 2018

(86) PCT No.: PCT/JP2018/010749
§ 371 (c)(1),
(2) Date: Sep. 16, 2019

(87) PCT Pub. No.: WO2018/180680
PCT Pub. Date: Oct. 4, 2018

(65) Prior Publication Data
US 2020/0010362 A1  Jan. 9, 2020

(30) Foreign Application Priority Data

Mar. 30, 2017 (JP) .................. 2017-067414
Jan. 29, 2018 (JP) .................. 2018-012143

(51) Int. Cl.
*C04B 7/44* (2006.01)
*C04B 7/28* (2006.01)
(Continued)

(52) U.S. Cl.
CPC .................. *C04B 7/44* (2013.01); *B09B 3/00* (2013.01); *C04B 7/28* (2013.01); *C04B 18/08* (2013.01); *B09B 2220/06* (2013.01)

(58) Field of Classification Search
CPC .. C04B 7/28; C04B 7/44; C04B 18/08; B09B 3/00; B09B 2220/06
(Continued)

(56) References Cited

U.S. PATENT DOCUMENTS 8,636,841 B2 * 1/2014 Nakamura ............... C04B 7/52
106/772
2010/0089801 A1   4/2010 Ando et al.
(Continued)

FOREIGN PATENT DOCUMENTS

JP    58-85011 A    5/1983
JP    58-95576 A    6/1983
(Continued)

OTHER PUBLICATIONS

International Search Report for PCT/JP2018/010749 dated Apr. 24, 2018.
(Continued)

*Primary Examiner* — Terrell H Matthews
(74) *Attorney, Agent, or Firm* — Birch, Stewart, Kolasch & Birch, LLP

(57) ABSTRACT

A process for producing a modified fly ash comprising the steps of providing, as a raw material, the raw fly ash discharged from a pulverized coal combustion boiler; classifying the raw fly ash into a crude powder and a fine powder; removing the unburned carbon contained in the crude powder by heating the crude powder at a temperature in a range of 500 to 1000° C.; and mixing together the crude powder from which the unburned carbon has been removed and the fine powder to obtain a modified fly ash.

4 Claims, 3 Drawing Sheets

(51) Int. Cl.
*B09B 3/00* (2006.01)
*C04B 18/08* (2006.01)

(58) Field of Classification Search
USPC .......................................................... 209/233
See application file for complete search history.

(56) References Cited

U.S. PATENT DOCUMENTS

| 2010/0147196 A1* | 6/2010 | Saito ..................... C04B 7/26 |
| | | 106/709 |
| 2020/0010362 A1* | 1/2020 | Omura ..................... B09B 5/00 |

FOREIGN PATENT DOCUMENTS

| JP | 59-60115 A | 4/1984 | | |
| JP | 7-155740 A | 6/1995 | | |
| JP | 10-1339 A | 1/1998 | | |
| JP | 10-45444 A | 2/1998 | | |
| JP | 11-60299 A | 3/1999 | | |
| JP | 2001-121084 A | 5/2001 | | |
| JP | 2001-342053 A | 12/2001 | | |
| JP | 2002274906 A | * | 9/2002 | ............ C04B 18/10 |
| JP | 2004-188292 A | 7/2004 | | |
| JP | 2007-780 A | 1/2007 | | |
| JP | 2008-23855 A | 2/2008 | | |
| JP | 2008-126117 A | 6/2008 | | |
| JP | 2008-279321 A | 11/2008 | | |
| JP | 2013-56980 A | 3/2013 | | |
| JP | 2018-43910 A | 3/2018 | | |
| JP | 2018-54212 A | 4/2018 | | |
| KR | 20190127737 A | * | 11/2019 | ............... C04B 7/28 |
| WO | WO-2018168637 A1 | * | 9/2018 | ............ C04B 18/08 |
| WO | WO-2018180680 A1 | * | 10/2018 | ............... B09B 3/00 |
| WO | WO-2019176640 A1 | * | 9/2019 | ............ C04B 18/08 |

OTHER PUBLICATIONS

English Translation of Written Opinion of the International Searching Authority dated Apr. 24, 2018, issued in PCT/JP2018/010749 (Form PCT/ISA/237).

* cited by examiner

PROCESS FOR PRODUCING MODIFIED FLY ASH

TECHNICAL FIELD

This invention relates to a process for producing a modified fly ash containing unburned carbon in small amounts.

BACKGROUND ART

A coal burning thermal power plant generates large amounts of coal ash which is a residue of coal after it has burned. Disposal of the coal ash is mostly relying on the field of cement and the field of civil engineering. Specifically, it is largely relying on the field of cement, and about 65% of the whole coal ash has been utilized as a raw material for the production of the cement clinker.

On the other hand, it has been expected that the coal ash would be generated in increasing amounts accompanying an increase in the number of the coal burning thermal power plants that are newly constructed and an increase in the rate of operation. It is, therefore, an urgent task to expand the use of the coal ash in addition to using it as the raw material for the production of the cement clinker.

Boilers in the coal burning thermal power plants can be roughly divided into two types, i.e., pulverized coal combustion boilers and fluidized bed combustion boilers. Boilers of the pulverized coal combustion type generate fly ash and clinker ash at all times while boilers of the fluidized bed combustion type generate fly ash at all times.

The fly ash is recovered from dust collecting facilities such as electric dust catcher and bag filter while the clinker ash is recovered from the bottom portion of the boilers. Both of them chiefly comprise $SiO_2$ (silica) and $Al_2O_3$ (alumina). The fly ash, for example, comprises spherical dense particles while the clinker ash comprises porous particles. It is, therefore, required to establish treatment technologies that meet their properties as well as to establish technologies for effectively utilizing them.

The fly ash exhibit properties that greatly differ depending on if it was generated from the pulverized coal combustion boiler (hereinafter often called PCF ash) or if it was generated from the fluidized bed combustion oiler (hereinafter often called FBF ash). Being affected by the desulfurization, for example, the FBF ash may often contain CaO (lime), anhydrous gypsum, calcium hydroxide and the like.

Of these kinds of fly ashes, the PCF ash can be used, for example, as a mixing material for cement or as a mixing material for concrete in addition to being used as the raw material for the production of the cement clinker. When the PCF ash is to be used as such mixing materials, it is desired that the unburned carbon is contained therein in small amounts. As for other properties such as fineness and chemical components, it is required that the PCF ash satisfies a predetermined standard (see, for example, JIS A 6201). It is, further, required that the PCF ash has little fluctuations in the quality depending upon the lots.

On the other hand, due to differences in the features such as the particle shapes and components, the FBF ash has properties different from those of the PCF ash. Therefore, the FBF ash in many cases fails to meet the standards for use as the mixing material for cement or as the mixing material for concrete. Namely, the FBF ash cannot be effectively utilized in the above applications and is, therefore, used in many cases as the raw material for the production of the cement clinker.

In order for the power plant to stably generate the PCF ash having properties suited for use as the mixing material for cement or as the mixing material for concrete, however, the coal which is the fuel and the conditions for operating the power plant may be so limited that there is generated the PCF ash that is suited for the above use. It is not, however, practicable and advantageous to operate the power plant placing importance on the quality of the fly ash that is the by-product since the power plant is a facility that is designed and operated to generate the electric power.

Therefore, it has been urged to provide a technology that is capable of efficiently obtaining the fly ash that can be used as the mixing material for cement and as the mixing material for concrete from the raw fly ash having various properties generated as a result of operating the coal burning thermal power plant.

For example, patent documents 1 and 2 are proposing technologies that sort out the fly ash by sieving, and use the fine particulate components thereof as the fly ash that meets the JIS standards so as to be utilized as mixing materials.

Further, patent documents 3 and 4 are proposing technologies for removing by combustion the unburned carbon in the coal ash by using a rotary kiln.

PRIOR ART DOCUMENTS

Patent Documents

Patent document 1: Japanese Patent Laid-Open No. 2001-121084
Patent document 2: Japanese Patent Laid-Open No. 095576/1983
Patent document 3: Japanese Patent Laid-Open No. 2008-126117
Patent document 4: Japanese Patent Laid-Open No. 060299/1999

OUTLINE OF THE INVENTION

Problems that the Invention is to Solve

Technologies disclosed in the patent documents 1 and 2 are capable of decreasing the amount of the unburned carbon contained in the fly ash leaving, however, a problem in regard to treating the residue (crude powder) that generates after the sieving. Besides, if the raw fly ash contains the unburned carbon in different amounts, then the modified fly ash that is produced also contains the unburned carbon in different amounts making it difficult to assure homogeneity in the quality.

Technologies disclosed in the patent documents 3 and 4 are capable of effectively removing the unburned carbon using, however, a gas heated at 600 to 1000° C. and, therefore, necessitating a tremendous amount of energy, which is a problem.

It is, therefore, an object of the present invention to efficiently produce a modified fly ash containing the unburned carbon in decreased amounts from the fly ash having various properties generated from the pulverized coal combustion boilers.

Another object of the present invention is to provide a modified fly ash containing the unburned carbon in decreased amounts and having a quality that lies within a predetermined range without permitting fluctuation in the amount of the unburned carbon contained therein.

Means for Solving the Problems

According to the present invention, there is provided a process for producing a modified fly ash including steps of:

providing, as a raw material, the raw fly ash discharged from a pulverized coal combustion boiler;

classifying the raw fly ash into a crude powder and a fine powder;

removing the unburned carbon contained in the crude powder by heating the crude powder at a temperature in a range of 500 to 1000° C.; and mixing together the crude powder from which the unburned carbon has been removed and the fine powder to obtain a modified fly ash.

In the process for producing the modified fly ash of the present invention, the following embodiments can be favorably employed.

(1) The step is included for measuring the amount of the unburned carbon contained in the raw fly ash prior to the step of classification, and classification conditions are set in the step of classification depending upon the amount of the unburned carbon contained in the raw fly ash;

(2) In the embodiment (1) above, classification is executed in the step of classification by using a sieve, and the raw fly ash is classified in the step of classification while setting the perforation size of the sieve that is used as described below depending on the amount of the unburned carbon that is measured;

(3) In the embodiment (2) above, classification is executed in the step of classification by using a sieve, and the raw fly ash is classified in the step of classification while setting the perforation size of the sieve that is used as described below depending on the amount of the unburned carbon that is measured;

| Content of the unburned carbon | Sieve perforation size |
| --- | --- |
| Less than 4% by mass | 90 to 150 μm |
| Not less than 4% by mass but less than 8% by mass | 45 to 90 μm |
| Not less than 8% by mass | 20 to 45 μm |

(4) A reference threshold content of the unburned carbon contained in the finally obtained modified fly ash is set to lie in a range of 1 to 4% by mass, the step is included for measuring the amount of the unburned carbon contained in the fine powder obtained in the step of classification and, in the step of mixing, the ratio of mixing the fine powder and the crude powder is adjusted so that the amount of the unburned carbon contained in the modified fly ash obtained by mixing together the fine powder and the crude powder from which the unburned carbon has been removed, lies in a range of the reference threshold content ±0.5% by mass;

(5) The step is included for measuring the amount of the unburned carbon contained in the raw fly ash prior to the step of classification, a threshold value of not less than 6% by mass is set for the amount of the unburned carbon contained in the raw fly ash, and a reference threshold content of the unburned carbon contained in the finally obtained modified fly ash is set to lie in a range of 1 to 4% by mass;

the raw fly ash containing the unburned carbon in an amount less than the threshold value is classified in the step of classification, the fine powder obtained in the step of classification is stored in a first silo, the crude powder obtained in the step of classification is introduced into the step of removing the unburned carbon and is stored in a second silo after the unburned carbon has been removed therefrom;

the raw fly ash containing the unburned carbon in an amount not less than the threshold value is not introduced into the step of classification but is introduced into the step of removing the unburned carbon to remove the unburned carbon therefrom, and the obtained fly ash from the unburned carbon has been removed is stored in the second silo like the crude powder; and the fine powder stored in the first silo and the fly ash stored in the second silo and from which the unburned carbon has been removed are mixed together in the step of mixing so that the amount of the unburned carbon contained in the modified fly ash lies in a range of the reference threshold content ±0.5% by mass.

(6) In the embodiment (5) above, the step is included for measuring the amount of the unburned carbon contained in the fine powder stored in the first silo.

Effects of the Invention

According to the process of the present invention, the raw fly ash is classified into a fine powder and a crude powder, and the crude powder is heated at a temperature in a range of 500 to 1000° C. to remove the unburned carbon. The crude powder from which the unburned carbon is removed is mixed into the fine powder again to obtain a modified fly ash. Namely, the modified fly ash is a fly ash of a high quality containing the unburned carbon in an amount less than that of the raw fly ash. Besides, the modified fly ash is obtained without producing any residue that must be disposed of. Therefore, it is allowed to obtain the modified fly ash very efficiently.

The present invention, further, adjusts the ratio of mixing the fine fly ash obtained through the classification and the crude fly ash from which the unburned carbon has been removed and, is therefore, capable of adjusting the amount of the unburned carbon contained in the modified fly ash. It is, therefore, made possible to obtain the modified fly ash of a predetermined quality decreasing the fluctuation in the amount of the unburned carbon contained therein.

According to the present invention, furthermore, heating for removing the unburned carbon is executed for only the crude powder that is obtained through the classification. This helps greatly decrease the amount of heat energy that is required.

The modified fly ash obtained by the production process of the present invention is of a high quality containing the unburned carbon in decreased amounts, and can be excellently used as a mixing material for cement and a mixing material for concrete.

MODES FOR CARRYING OUT THE INVENTION

In the present invention, the fly ash that is to be treated is the coal ash that generates when the fuel that is mainly the coal is burned in the pulverized coal combustion boiler and that is trapped by the dust collecting facility (i.e., the above-mentioned PCF ash). The boiler of this kind is, in many cases, provided in the coal burning thermal power plants. The present invention, however, is not limited to the fly ash that is discharged from the coal burning thermal power plants only.

The fly ash contains the unburned carbon more or less. The fly ash generated in the pulverized coal combustion boiler contains the unburned carbon in an amount of, usually, 1 to 15% by mass. If the unburned carbon is contained in large amounts, a problem occurs when the fly ash is used as a mixing material for cement or concrete. That is, the unburned carbon that is contained in large amounts is highly likely to develop a problem, i.e., the unburned carbon floats on the surfaces of the mortar or the concrete and dark colored portions emerge. There may, further, develop another problem in that a chemical agent such as chemical blending agent is adsorbed by the unburned carbon, causing a decrease in the workability.

The present invention, therefore, tries to decrease the amount of the unburned carbon contained in the fly ash, and produces the modified fly ash that contains the unburned carbon in small amounts and, more preferably, that contains the unburned carbon in an almost predetermined amount without fluctuation.

Figure 1:
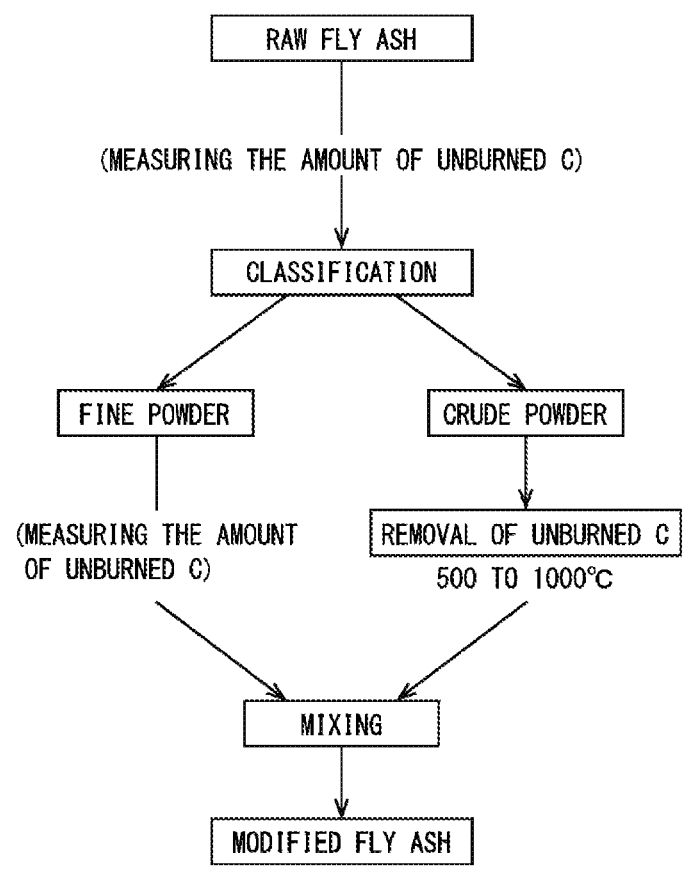
FIG. 1 It is a chart illustrating a basic flow of a process for the production of a modified fly ash according to the present invention.

Referring to the flow chart of FIG. 1, according to the present invention, the fly ash discharged from the above-mentioned pulverized coal combustion boiler is stored in a predetermined storage facility (silo). From this raw fly ash that is the raw material, the invention produces a modified fly ash that contains the unburned carbon in a decreased amount. That is, according to the basic process of the present invention, the raw fly ash (hereinafter often simply as raw powder) is classified (step of classification), and the crude powder obtained through the step of classification is heat-treated at a predetermined temperature (step of removing the unburned carbon). Through the heat treatment, the unburned carbon is removed from the crude powder, and the amount of the unburned carbon therein becomes almost zero. The crude powder from which the unburned carbon is removed as described above is then mixed with the fine powder obtained through the step of classification (step of mixing). Accordingly, there is obtained the modified fly ash containing the unburned carbon in decreased amounts.

That is, according to the present invention, the crude powder obtained by classifying the raw powder is mixed with the fine powder again. Therefore, no fly ash needs be disposed of, and the modified fly ash can be efficiently obtained. Moreover, only the crude powder that contains much unburned carbon is combustion-treated contributing to decreasing the amount that must be treated. Besides, the crude powder that contains much unburned carbon serves as a source of heat and contributes to decreasing the cost of heat energy.

Moreover, according to the present invention as will be understood from the above flow chart, the raw fly ash or the fine powder obtained through the classification is suitably measured for the amount of the unburned carbon contained therein in order to adjust the classifying conditions in the step of classification relying on the measured value and to, further, adjust the ratio of mixing the fine powder with the crude powder from which the unburned carbon has been removed in the step of mixing.

Methods of measuring the amount of the unburned carbon contained in the fly ash have been known. For example, the following methods have been known.

(a) A method of detecting the $CO_2 \cdot CO$ gases generated by the combustion by using infrared rays;
(b) A method of measuring the ignition loss and estimating the amount of the unburned carbon from the ignited raw material;
(c) A method of calculation based on the amounts of Methylene Blue adsorption;
(d) Bulk specific gravity testing; and
(e) A method of estimating the amount of the unburned carbon by the irradiation with microwaves.

For instance, the fly ash containing the unburned carbon in an amount of not more than 3% by mass and, specifically, not more than 2% by mass is little probable to develop the above-mentioned problems and little requires the application of the modifying method of the present invention. In such a case, therefore, upon measuring the amount of the unburned carbon in the raw fly ash, it can be so regarded that the fly ash does not require the application of the present invention.

In the present invention, the raw fly ash is classified in the step of classification into the crude powder and the fine powder. Here, however, the unburned carbon is much distributed on the side of the crude powder that has a large volume. Namely, the fine powder contains the carbon in small amounts while the crude powder contains the unburned carbon in large amounts. Therefore, the present invention treats by combustion the crude powder that contains the unburned carbon in large amounts but does not treat by combustion the fine powder that contains the unburned carbon in small amounts.

In the above step of classification, for example, the smaller the classification point, the smaller the amount of the unburned carbon contained in the fine powder resulting, however, in an increase in the amount of the crude powder that must be put to the step of treating the crude powder by combustion to remove the unburned carbon. This, however, is not desirable from the standpoint costs. In general, therefore, the classification is executed by setting the classification point in a range of 20 to 150 μm.

There is no specific limitation on the method of classification, and there can be used the one that is usually used for the classification of the powders, such as sieve classification, pneumatic classification, centrifugal classification, etc.

The classification point, in the case of the sieve classification, can be easily set by varying the perforation size of the sieve that is used. In the case of the pneumatic classification, the classification point can be adjusted by varying the air flow. In the case of the centrifugal classification, the classification point can be adjusted by varying the rotational speed and the like.

The present invention most favorably employs the sieve classification. That is, in the case of the sieve classification as compared to other classification means, the unburned carbon is contained in very small amounts on the side of the fine powder provided the classification point remains the same. Therefore, the modified fly ash that is finally obtained contains the unburned carbon in very decreased amounts. The classification by sieve is dependent upon the size (volume) of the raw fly ash whereas the other classification means are dependent upon the weight of the raw fly ash. It is, therefore, considered that the sieve classification is capable of efficiently shifting the unburned carbon of large volume toward the crude powder side.

By employing the sieve classification, as described above, the unburned carbon can be efficiently concentrated on the crude powder side by increasing the classification point. As a result, the amount of the crude powder can be decreased and the energy cost required for the combustion can be decreased, too.

The amounts of the unburned carbon contained in the crude powder and the fine powder recovered by the sieve classification differ depending on the classification point and the properties of the fly ash. Usually, however, the crude powder contains the unburned carbon in an amount of 5 to 35% by mass and the fine powder contains the unburned carbon in an amount of 1 to 10% by mass; i.e., most of the unburned carbon is recovered being contained in the crude powder. The larger the amount of the unburned carbon contained in the raw fly ash, the larger the amounts of the unburned carbon contained in the crude powder and the fine powder.

In conducting the classification by using the sieve, furthermore, despite the sieve perforation size remains the same, the amount of the unburned carbon tends to increase on the fine powder side if the unburned carbon is contained in large amounts in the raw fly ash.

Figure 2:
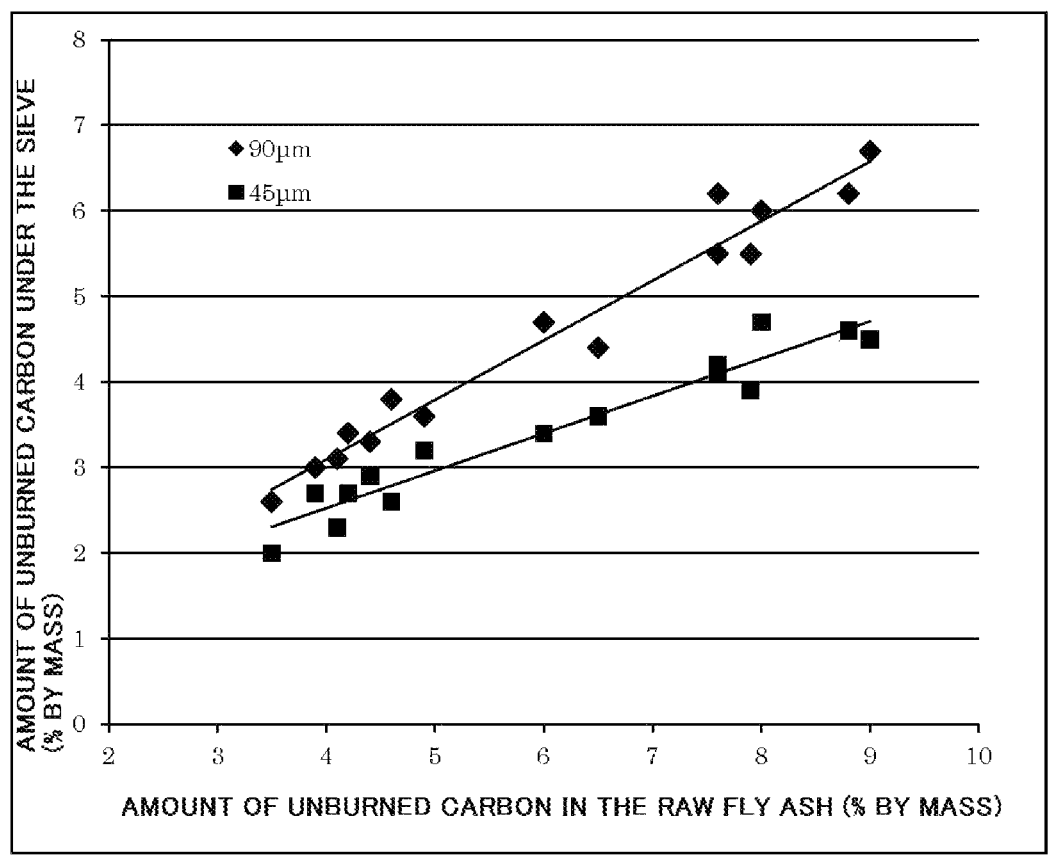
FIG. 2 It is a graph showing the amounts of the unburned carbon in the raw fly ash used as the raw material and the amounts of the unburned carbon in the fine powders (fly ashes under the sieves) of when the raw fly ash is classified using a sieve of a perforation size of 90 μm and a sieve of a perforation size of 45 μm.

For instance, Table 1 below shows the amounts of the unburned carbon (% by mass) contained in the raw fly ashes and the amounts of the unburned carbon (% by mass) contained in the fine powders (under the sieves) obtained by classifying the raw fly ashes by using the sieves having perforation sizes of 90 μm, 75 μm and 45 μm. Further, FIG. 2 shows the amounts of the unburned carbon contained in the raw fly ashes and the amounts of the unburned carbon contained in the fine powders obtained by classifying the raw fly ashes by using the sieves having perforation sizes of 90 μm and 45 μm.

The amounts of the unburned carbon shown here are the values obtained by the ignition loss testing method specified under the JIS A 6201. The amounts of the unburned carbon described in the specification of this application are all the values obtained relying upon this method.

TABLE 1

Amounts of the unburned carbon (% by mass) contained in the fine powders obtained through the classification by using the sieves having various perforation sizes.

| Sample No. | Raw fly ashes | Sieve perforation sizes (μm) | | |
|---|---|---|---|---|
| | | 90 μm | 75 μm | 45 μm |
| No. 1 | 3.5 | 2.6 | 2.5 | 2.0 |
| No. 2 | 3.9 | 3.0 | 3.0 | 2.7 |
| No. 3 | 4.1 | 3.1 | 2.8 | 2.3 |
| No. 4 | 4.2 | 3.4 | 3.2 | 2.7 |
| No. 5 | 4.4 | 3.3 | 3.3 | 2.9 |
| No. 6 | 4.6 | 3.8 | 3.4 | 2.6 |
| No. 7 | 4.9 | 3.6 | 3.6 | 3.2 |
| No. 8 | 6.0 | 4.7 | 4.4 | 3.4 |
| No. 9 | 6.5 | 4.4 | 4.3 | 3.6 |
| No. 10 | 7.6 | 6.2 | 5.9 | 4.1 |
| No. 11 | 7.6 | 5.5 | 5.2 | 4.2 |
| No. 12 | 7.9 | 5.5 | 5.2 | 3.9 |
| No. 13 | 8.0 | 6.0 | 5.8 | 4.7 |
| No. 14 | 8.8 | 6.2 | 5.9 | 4.6 |
| No. 15 | 9.0 | 6.7 | 6.2 | 4.5 |

As will be understood from Table 1 and FIG. 1 above, if the unburned carbon is much contained in the raw fly ashes, the unburned carbon is much contained in the fine powders, too. However, if the fine powder contains too much unburned carbon, various problems may occur when the fine powder is mixed into the crude powder from which the unburned carbon has been removed by the heat treatment that will be described later.

According to the present invention, therefore, it is desired to measure the amount of the unburned carbon in the raw fly ash and adjust the classification conditions (classification point) depending on the amount of the unburned carbon. When, for example, the raw fly ash contains the unburned carbon in large amounts, use is made of a sieve having a small perforation size in order to decrease the amount of the unburned carbon in the fine powder as much as possible. When the raw fly ash contains the unburned carbon in small amounts, use is made of a sieve having a large perforation size in order to decrease the amount of the crude powder that contains the unburned carbon in large amounts thereby to decrease the amount of energy required for the heat treatment (for removing the unburned carbon) that will be described later.

Table 2 below shows the recovery percentages of the fine powders obtained under the sieves when the classification is executed by using the sieves having perforation sizes of 90 μm, 75 μm and 45 μm as described above.

TABLE 2

Recovery percentages of the fine powders obtained through the classification by using the sieves having various perforation sizes.

| Sample No. | Sieve perforation sizes (μm) | | |
|---|---|---|---|
| | 90 μm | 75 μm | 45 μm |
| No. 1 | 93.8 | 92.0 | 84.7 |
| No. 2 | 86.9 | 86.1 | 72.7 |
| No. 3 | 93.1 | 90.7 | 81.6 |
| No. 4 | 87.5 | 85.0 | 73.7 |
| No. 5 | 88.1 | 84.5 | 71.3 |
| No. 6 | 95.0 | 94.5 | 86.8 |
| No. 7 | 87.3 | 85.2 | 72.8 |
| No. 8 | 94.5 | 92.6 | 85.0 |
| No. 9 | 88.1 | 86.8 | 75.3 |
| No. 10 | 93.4 | 91.2 | 82.0 |
| No. 11 | 89.7 | 87.2 | 77.4 |
| No. 12 | 88.6 | 84.3 | 74.2 |
| No. 13 | 87.7 | 84.9 | 73.8 |
| No. 14 | 87.4 | 85.1 | 70.8 |
| No. 15 | 89.3 | 87.1 | 76.4 |

As will be understood from Table 2 above, when the classification is executed by using a sieve of a large perforation size, the fine powder can be recovered in large amounts. When the classification is executed by using a sieve of a small perforation size, on the other hand, the fine powder is recovered in small amounts.

When the classification conditions are to be set depending on the amount of the unburned carbon in the raw fly ash, therefore, it is desired that the classification point (sieve perforation size) is set as described below so that the amount of the unburned carbon decreases in the fine powder and that amass balance between the fine powder and the crude powder lies in a suitable range.

| Content of unburned carbon | Sieve perforation size |
|---|---|
| Less than 4% by mass | 90 to 150 μm |
| Not less than 4% by mass but less than 8% by mass | 45 to 90 μm |
| Not less than 8% by mass | 20 to 45 μm |

That is, as described above, the classification is executed by using a sieve having a perforation size that differs depending on the content of the unburned carbon in the raw fly ash. This, for example, makes it possible to obtain, stably and in large amounts, the fine powder containing the unburned carbon in an amount of not more than 4.5% by mass and, therefore, to easily adjust the amount of the unburned carbon in the modified fly ash obtained through the subsequent step of mixing.

Further, as will be understood from Table 1 and FIG. 1 described above, when the unburned carbon is contained in very large amounts in the raw fly ash, the amount of the unburned carbon does not so much decrease in the fine powder despite the classification is executed. Namely, if the classification is executed by using a sieve having a small perforation size in order to decrease the amount of the unburned carbon in the fine powder, then the fine powder is recovered in a decreased amount as will be understood from Table 2. That is, when the unburned carbon is contained in very large amounts in the raw fly ash, little advantage is obtained through the classification and, besides, the same amount of work is still required for the classification.

When the raw fly ash contains the unburned carbon in very large amounts, therefore, it is desired that the raw fly ash be directly fed to the step of removing the unburned carbon without executing the classification. This embodiment will be described later.

The thus obtained fine powder is suitably stored once in a silo and is, thereafter, introduced from the silo into the step of mixing that will be described later. Upon measuring the amount of the unburned carbon contained in the fine powder, it becomes possible to more finely adjust the amount of the unburned carbon contained in the modified fly ash obtained through the step of mixing described later so that the amount of the unburned carbon lies in a predetermined range.

Further, the crude powder obtained through the above-mentioned classification is once stored in a silo and is, thereafter, fed from the silo to the step of removing the unburned carbon where the unburned carbon is removed relying on the heat treatment at a high temperature.

That is, the heat treatment is executed for removing the unburned carbon contained in the crude powder, and the heating temperature is 500 to 1000° C., preferably, 600 to 1000° C., more preferably, 650 to 950° C. and, most preferably, 700 to 950° C. If the temperature is too low, the unburned carbon does not burn and cannot be removed to a sufficient degree. If the temperature is too high, on the other hand, the crude powder is sintered or melted causing a change in the mineral composition or in the fineness of the powder, and becomes not suited for use as a mixing material for cement or concrete.

Through the heat treatment, it is desired that the amount of the unburned carbon contained in the crude powder is decreased to, usually, not more than 3% by mass, preferably, not more than 1% by mass, more preferably, not more than 0.5% by mass and, specifically, 0 to about 0.2% by mass. The higher the heating temperature, the shorter the time for removing the unburned carbon by combustion.

There is no specific limitation on the method of heating the crude powder in the heat treatment. Namely, the crude powder can be heated by a generally employed method of heating the powders or by a method that is employed on an industrial scale for firing the powders. For example, there can be used such methods that use a rotary kiln, a fluidized bed furnace and a whirl stream firing furnace.

The unburned carbon is removed by being heated using a hot gas of a very high temperature (500 to 1000° C.) and, therefore, requiring a tremendous amount of energy. The present invention, however, heats only the crude powder in which the unburned carbon is concentrated. Therefore, the unburned carbon by itself generates the heat to play the role of a fuel making it, therefore, possible to greatly decrease the amount of energy that is required as compared to when the raw fly ash is heated. Besides, the fine powder that is sieved can be heated requiring no energy contributing to further greatly decreasing the amount of energy requirement.

The crude powder containing the unburned carbon in greatly decreased amounts by being heated is suitably stored once in the silo (storage facility) and is, thereafter, mixed with the fine powder in the next step of mixing. A modified fly ash is thus obtained through the step of mixing. The modified fly ash comprises the crude powder from which the unburned carbon has been removed and the fine powder that contains the unburned carbon in small amounts, which are mixed together. As compared to the raw fly ash, therefore, the modified fly ash features an improved quality containing the unburned carbon in decreased amounts.

There is no specific limitation on the method of mixing the fine powder and the crude powder together, and there can be used a mixing machine that is usually used for mixing the powders. Or the powders can be mixed together in the step of transfer. For instance, the mixing machine for mixing powders can be the one of the mechanical stirrer type or the air stream type. For mixing the powders in the step of transfer, there can be used a mixing machine of the type of continuously transferring the powders or a fluidized mixing machine in a facility of blowing the compressed air.

In the invention, the amount of the unburned carbon contained in the modified fly ash obtained through the mixing is probable to vary over a range of about 1 to about 10% by mass through dependent upon the amount of the unburned carbon contained in the raw fly ash.

If the amount of the unburned carbon varies, then the fluidity, color tone and the required amount of addition may often vary when the fly as is used as a mixing material for cement or concrete.

According to the present invention, therefore, a reference threshold value of the amount of the unburned carbon contained in the desired modified fly ash is set to lie in a range of 1 to 4% by mass. Further, the ratio of mixing the fine powder and the crude powder from which the unburned carbon has been removed by the combustion treatment is desirably so set that the amount of the unburned carbon lies within a range of the reference threshold value ±0.5% by mass. This makes it possible not only to lower the amount of the unburned carbon but also to maintain the amount of the unburned carbon within a nearly constant range to assure the quality.

Upon using the modified fly ash having high and constant quality as the mixing material for cement or concrete, it is allowed to maintain the fluidity, color tone and the amount of addition to remain constant. The above reference threshold value can be suitably set depending on the object of using the modified fly ash, as a matter of course.

In the invention, the mixing ratio for obtaining the modified fly ash in which the amount of the unburned carbon is in the range of the reference threshold value ±0.5% by mass can be easily determined from the amount of the unburned carbon in the fine powder and the amount of the unburned carbon in the fired crude powder.

For this purpose, it is desired that the conditions for combusting the crude powder are so determined that the amount of the unburned carbon is 0 to 0.2% by mass in the crude powder that is treated by combustion. That is, even if the amount of the unburned carbon is calculated to be 0% by mass in the crude powder that is to be mixed to the fine powder, it is easy to attain the reference threshold value ±0.5% by mass. Therefore, only the fine powder needs be measured for the amount of the unburned carbon contained therein. It is, however, allowable to also measure the amount of the unburned carbon contained in the fired crude powder, as a matter of course.

The fine powder recovered after the classification is once stored in the silo. It is, here, desired to measure the amount of the unburned carbon contained in the fine powder that is taken out from the silo. The silo, in many cases, stores the fine powder obtained by classifying the raw fly ash that contains much unburned carbon as well as the fine powder obtained by classifying the raw fly ash containing little unburned carbon. Therefore, the fine powder taken out from the silo is better measured for its content of unburned carbon from the standpoint of being mixed to the crude powder. For instance, the device for measuring the amount of the unburned carbon is installed in the take-out port of the silo or in the vicinity thereof to take the measurement.

When the fine powder taken out from the silo contains the unburned carbon in small amounts, the crude powder is mixed at a small ratio with the fine powder. When the fine powder contains the unburned carbon in large amounts, the crude powder is mixed at a large ratio with the fine powder. It is thus made possible to maintain the amount of the unburned carbon constant in the modified fly ash that is obtained by mixing the powders together.

Here, even if the fine powder and the crude powder obtained from the same raw fly ash are mixed together at a ratio as classified, the chances are small for obtaining the modified fly ash containing the unburned carbon in a desired amount. In many cases, either the fine powder or the crude powder becomes in short supply. For example, if the raw fly ash containing the unburned carbon in a small amount is continuously generated, then the crude powder from which the unburned carbon is removed by the combustion treatment becomes in short supply, and it would become difficult to continuously produce the modified fly ash.

To solve the above problem, it can be contrived to employ the following means in putting the invention into practice.

One means is to store the fine powder and the crude powder in slightly excess amounts in the storage facility (silo) in preparation for the lack of the fine powder and the fired crude powder. For instance, in case the raw fly ash containing the unburned carbon in a small amount is continuously supplied, the situation can be endured by using the crude powder that is stored to wait for the supply of the raw fly ash that contains the unburned carbon in a large amount.

Another means is a more positive method which adjusts the ratio of the crude powder and the fine powder obtained through the classification by varying the classification point based on the amount of the unburned carbon in the fly ash. As shown in Tables 1 and 2, for instance, despite the amount of the unburned carbon remains the same in the raw fly ash, the fine powder is recovered in decreased amounts as the classification point becomes small (as the sieve perforation size decreases) and the amount of the unburned carbon decreases, either.

Concretely speaking, reference is now made to the Sample No. 3 shown in Tables 1 and 2. When the sieve of a perforation size of 90 μm is used, the fine powder contains the unburned carbon in an amount of 3.1% by mass, and is recovered in an amount of 93.1%. Therefore, the crude powder is obtained in an amount of only 6.9% by mass at the greatest (if losses are neglected). Here, if it is attempted to produce the modified fly ash containing the unburned carbon in an amount of 2.0% by mass, it becomes necessary to use 64.5% by mass of the fine powder and 35.5% by mass of the crude powder that is so fired that the amount of the unburned carbon therein is 0% by mass. With the above recovery ratio, however, a mass balance cannot be quite maintained.

If the sieve having a perforation size of 45 μm is used, then the fine powder contains the unburned carbon in an amount of 2.3% by mass, and the ratio of mixing the fine powder increases up to 86.9% by mass. Besides, the recovery percentage of the fine powder decreases down to 81.6%, and the mass balance is thus reversed.

In case the fired crude powder tends to be in short supply, therefore, the classification point should be decreased. In case the fine powder tends to be in short supply, on the other hand, the classification point should be increased. Extreme imbalance between the fine powder and the fired crude powder can thus be prevented.

By applying the above method, further, the classification point can be varied depending upon the amount of the unburned carbon in the modified fly ash that is to be finally produced. That is, the classification point should be increased when the unburned carbon is required in slightly large amounts, and should be decreased when the unburned carbon is required in slightly small amounts. The modified fly ash of a homogeneous quality can be thus produced maintaining stability without much depending upon the amount of the unburned carbon in the raw fly ash.

According to the present invention as described above, the raw fly ash is classified into the fine powder and the crude powder, the unburned carbon is removed from the crude powder only, and the crude powder is mixed again with the fine powder to obtain the modified fly ash.

Here, as described already, when the unburned carbon is contained in a very large amount in the raw fly ash, the fine powder obtained by the classification also contains the unburned carbon in an increased amount. In this case, little advantage is attained by the classification. Besides, the classification requires nearly the same amount of laborious work.

Figure 3:
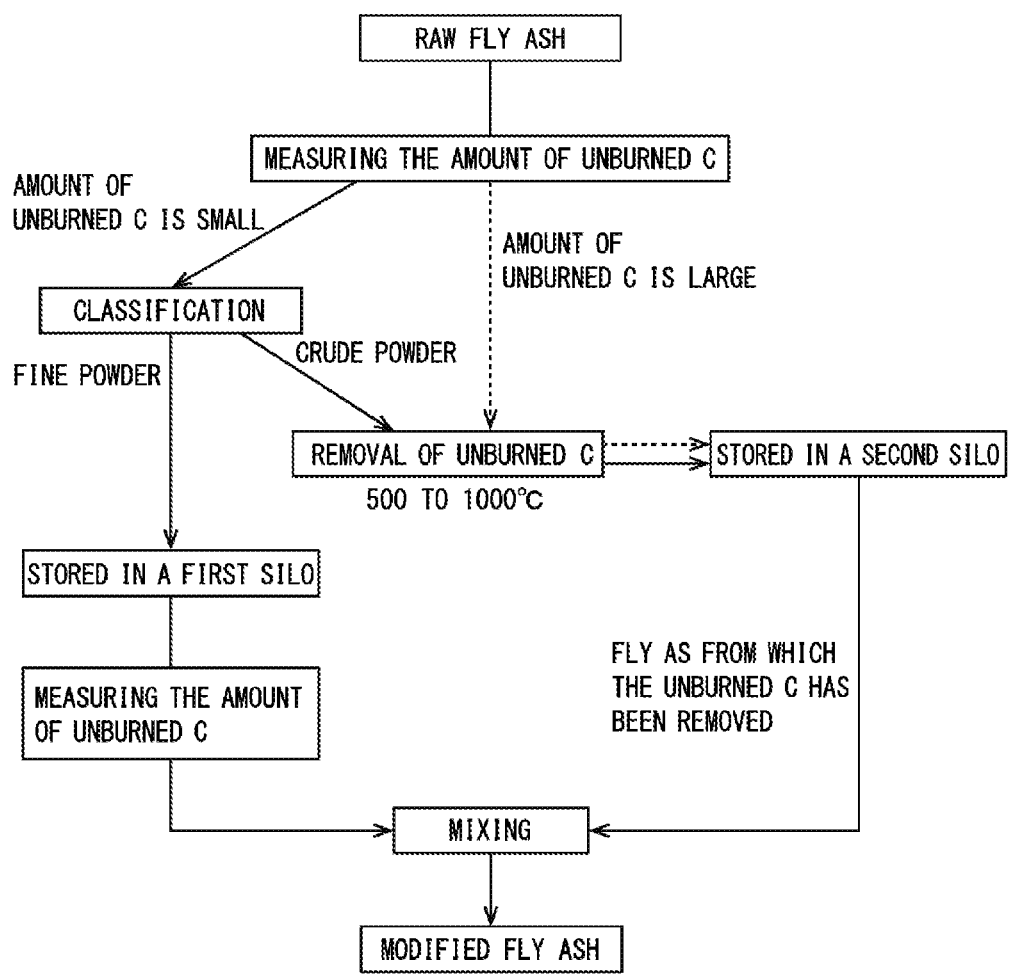
FIG. 3 It is a chart illustrating a flow in an embodiment of the process for the production of the modified fly ash according to the present invention.

Therefore, the present invention can be put into practice according to a flow chart shown in FIG. 3 by taking into consideration such a probability that the raw fly ash may often contain the unburned carbon in very large amounts.

That is, according to this embodiment as shown in FIG. 3, the raw fly ash is measured for its amount of unburned carbon contained therein. In this case, a predetermined threshold value is set for the amount of the unburned carbon, and the subsequent process is divided depending on the threshold value.

Namely, the classification provides almost no advantage when the raw fly ash contains the unburned carbon in very large amounts. In this case, therefore, the threshold amount of the unburned carbon is set to lie in a range which is not less than 6% by mass, preferably not less than 7% by mass and, more preferably, not less than 8% by mass. Here, however, it is meaningless even if the threshold value is set to be too high. Usually, therefore, the threshold value should be set to be not more than 20% by mass and, specifically, not more than 15% by weight. This is because there exists almost no raw fly ash that contains the unburned carbon in an amount in excess of 20% by mass and, specifically, in excess of 15% by mass.

First, when the amount of the unburned carbon is less than the threshold value, the classification is executed according to the method described above. The fine powder obtained through the classification is stored in a first silo. The crude powder obtained through the classification is heat-treated to remove the unburned carbon. The crude powder from which the unburned carbon is removed is stored in a second silo.

When the amount of the unburned carbon is not less than the above threshold value, on the other hand, the raw fly ash is not subjected to the classification but is directly heat-treated to remove the unburned carbon therefrom. The conditions for the heat treatment may be quite the same as those of the heat treatment (for removing the unburned carbon) for the crude powder.

The fly ash from which the unburned carbon is thus removed is then stored in a second silo like the crude powder from which the unburned carbon has been removed.

As described above, the fine powder is stored in the first silo and the fly ash from which the unburned carbon has been removed (i.e., raw fly ash and crude powder from which the unburned carbon has been removed) is stored in the second silo. These fly ashes are then mixed together to obtain the modified fly ash.

The fine powder stored in the first silo is suitably measured for the amount of the unburned carbon, and is mixed with the fly ash stored in the second silo and from which the unburned carbon has been removed so that the amount of the unburned carbon contained therein lies in the range of the predetermined reference threshold value ±0.5% by mass. There is thus obtained the fly ash having a high degree of and constant quality.

The thus obtained modified fly ash contains the unburned carbon in an amount smaller than that of the raw fly ash, and can be used as a mixing material for cement or a mixing material for concrete according to a known method.

EXAMPLES

As the raw material, there was provided a raw fly ash generated from a pulverized coal combustion boiler in a coal burning thermal power plant in Japan.

The raw fly ash contained the unburned carbon in an amount of 3.4% by weight.

The content of the unburned carbon was measured in compliance with the ignition loss testing method specified under the JIS A 6201.

First, by using a test sieve of a perforation size of 75 μm, 100.0 g of the fly ash was sieved while applying ultrasonic vibration thereto.

Due to the classification, there were recovered 9.8 g of a crude powder and 90.2 g of a fine powder.

The crude powder that was recovered contained the unburned carbon in an amount of 20.6% by mass while the fine powder contained the unburned carbon in an amount of 2.4% by mass.

Next, the crude powder was heated in an electric furnace maintained at 750° C. for 60 minutes. The crude powder after heated contained the unburned carbon in an amount of 0.1% by mass.

Thereafter, the crude powder after heated and the fine powder after classified were mixed together to obtain a modified fly ash.

The modified fly ash contained the unburned carbon in an amount of 2.1% by mass.

The content of the unburned carbon has been decreased as compared to those of the raw fly ash and the fine powder obtained through the classification.

Table 3 shows the contents of the unburned carbon in the fly ashes.

TABLE 3

Change in the content of the unburned carbon in the fly ashes.

|  | Content of the unburned carbon (% by mass) |
|---|---|
| Raw fly ash | 3.4 |
| Crude powder | 20.6 |
| Heated crude powder | 0.1 |
| Fine powder | 2.4 |
| Modified fly ash (Example) | 2.1 |

If it is attempted to obtain the modified fly ash containing the unburned carbon in an amount of 2.1% by mass by heating the whole raw fly ash without executing the classification, then it becomes necessary to heat 38.2 g of the raw fly ash to completely remove the unburned carbon therefrom out of 100.0 g of the raw fly ash.

According to the present invention (Example), on the other hand, the crude powder only needs be heated. The ratio of the crude powder is 9.8 g out of 100.0 g of the raw fly ash. Namely, about one-fourth of the amount may be heated as compared to when the whole fly ash is heated. Besides, since the unburned carbon that is concentrated plays the role of a fuel, the energy requirement can be greatly decreased.

The invention claimed is:

1. A process for producing modified fly ash, comprising:
providing, as a raw material, a raw fly ash discharged from a pulverized coal combustion boiler;
classifying said raw fly ash into a crude powder and a fine powder;
removing an unburned carbon contained in said crude powder by heating said crude powder at a temperature in a range of 500 to 1000° C.; and
mixing together said crude powder from which the unburned carbon has been removed and said fine powder to obtain a modified fly ash;
and further comprising a step of measuring an amount of the unburned carbon contained in said raw fly ash prior to the step of classification,
wherein classification conditions are set in said step of classification depending upon an amount of the unburned carbon measured to be contained in said raw fly ash,
wherein the raw fly ash containing the unburned carbon in large amounts is classified in said step of classification by using a sieve having a small perforation size, and the raw fly ash containing the unburned carbon in small amounts is classified in said step of classification by using the sieve having a large perforation size, and
wherein in executing the classification in said step of classification, the raw fly ash is classified in said step of classification while setting the perforation size of the sieve that is used as described below depending on the amount of the unburned carbon that is measured

| Content of the unburned carbon | Sieve perforation size |
|---|---|
| Less than 4% by mass | 90 to 150 μm |
| Not less than 4% by mass but less than 8% by mass | 45 to 90 μm |
| Not less than 8% by mass | 20 to 45 μm. |

2. The process for producing the modified fly ash according to claim 1, wherein a reference threshold content of the unburned carbon contained in the finally obtained modified fly ash is set to lie in a range of 1 to 4% by mass;

in said step of mixing, the ratio of mixing said fine powder and said crude powder is adjusted so that the amount of the unburned carbon contained in said modified fly ash obtained by mixing together said fine powder and said crude powder from which the unburned carbon has been removed, lies in a range of said reference threshold content ±0.5% by mass.

3. The process for producing the modified fly ash according to claim 1, wherein, a threshold value of not less than 6% by mass is set for the amount of the unburned carbon contained in said raw fly ash, and a reference threshold amount of the unburned carbon contained in said finally obtained modified fly ash is set to lie in a range of 1 to 4% by mass;

the raw fly ash containing the unburned carbon in an amount less than said threshold value is classified in said step of classification, said fine powder obtained in said step of classification is stored in a first silo, the crude powder obtained in said step of classification is introduced into the step of removing the unburned carbon and is stored in a second silo after the unburned carbon has been removed therefrom;

the raw fly ash containing the unburned carbon in an amount not less than said threshold value is not introduced into said step of classification but is introduced into said step of removing the unburned carbon to remove the unburned carbon therefrom, and the obtained fly ash from the unburned carbon has been removed is stored in the second silo like said crude powder; and the fine powder stored in said first silo and the fly ash stored in said second silo and from which the unburned carbon has been removed are mixed together in said step of mixing so that the amount of the unburned carbon contained in said modified fly ash lies in a range of said reference threshold content ±0.5% by mass.

4. The production process according to claim 3, further, including the step of measuring the amount of the unburned carbon contained in the fine powder stored in said first silo.

* * * * *